INVENTOR.
MILTON S. WEISS

United States Patent Office 3,533,707
Patented Oct. 13, 1970

3,533,707
LASER TARGET VIEWING DEVICE
Milton S. Weiss, Los Angeles, Calif., assignor to Korad Corporation, a corporation of New York
Filed June 21, 1965, Ser. No. 465,315
Int. Cl. G01j 1/42; H01s 3/00
U.S. Cl. 356—253                3 Claims

ABSTRACT OF THE DISCLOSURE

A rotating mirror having an aperture is interposed between a laser and target for directing light from the target away from the axis of light from the laser to permit viewing of the target. The rotation of the mirror is synchronized with the pulse repetition frequency of the laser such that the mirror is removed from an interposing position when the laser is pulsed. The arrangement permits viewing of the target directly along the axis of the laser radiation.

---

This invention relates generally to optical devices and more particularly to a novel device for viewing a target upon which laser light impinges.

Laser devices providing coherent radiation of light have found wide application in both medical and industrial fields. For example, because of the extremely coherent nature of the emitted light and the consequent ease of focussing the same at a given point, the laser beam can be employed as a surgical knife in performing delicate operations. In other instances, this same characteristic of the laser beam makes it very useful for performing welding operations on minute electrodes or wires in normally inaccessible places.

In each of the foregoing examples, it is very desirable to be able to view the particular target, such as skin tissue or components to be welded, along the identical axis that the laser beam is directed. If the target could be viewed along the axis of the laser beam, parallax effects would be eliminated and the ease and accurracy of carrying out the particular operation would be greatly increased.

It is, accordingly, a primary object of the present invention to provide a target viewing device for use with a laser which will enable a particular target to be viewed along the identical axis of the laser beam without interference with the laser beam.

Briefly, this object as well as other objects and advantages of this invention are attained by providing a means adapted to be periodically interposed between the laser device and the target in such a manner as to direct light from the target away from the axis of light from the laser. Further included are means for synchronizing the interposition of the first mentioned means with the pulse repetition rate of light from the laser device itself. With this arrangement, the pulses of light from the laser are free to pass directly to the target and between these pulses the interposed means serves to direct the light from the target itself away from the axis for viewing purposes so that a person viewing the target will, for all purposes be viewing directly along the same axis that the laser light passes to the target. The interposition rate is such that the persistence of the eye will result in the target appearing to be viewed continuously.

Figure 1:
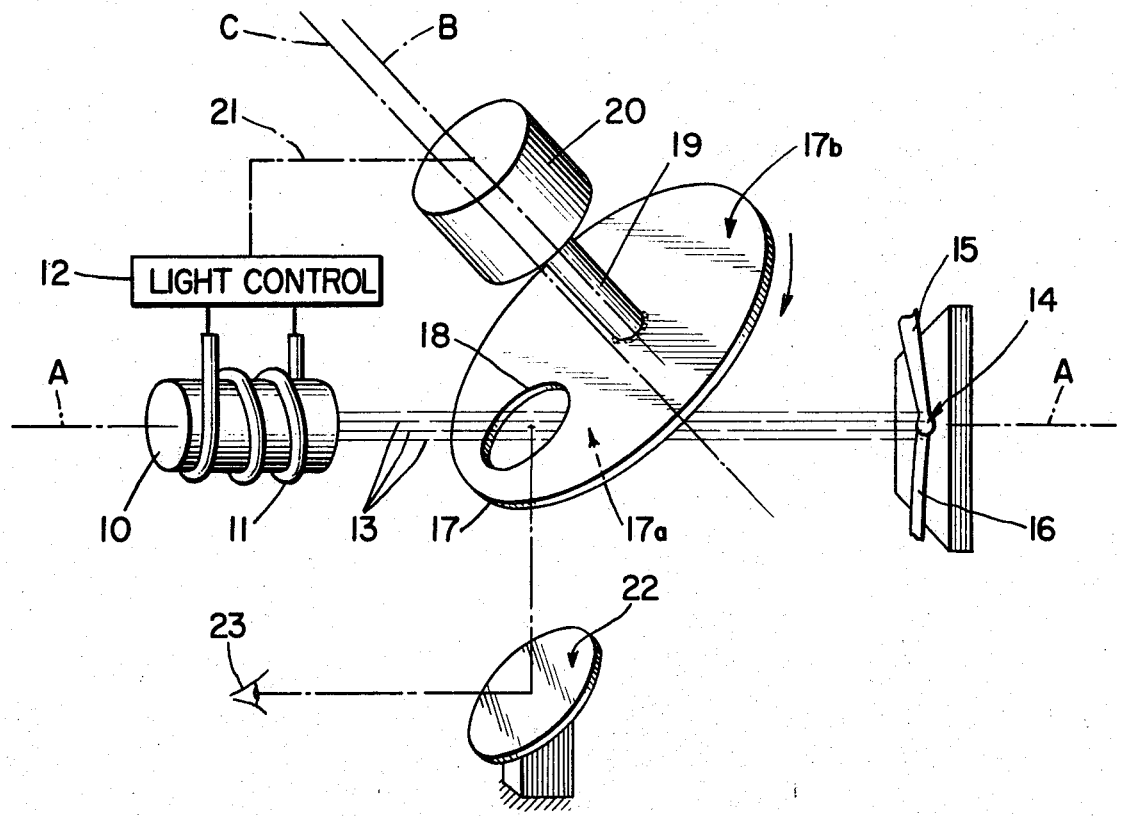
Figure 2:
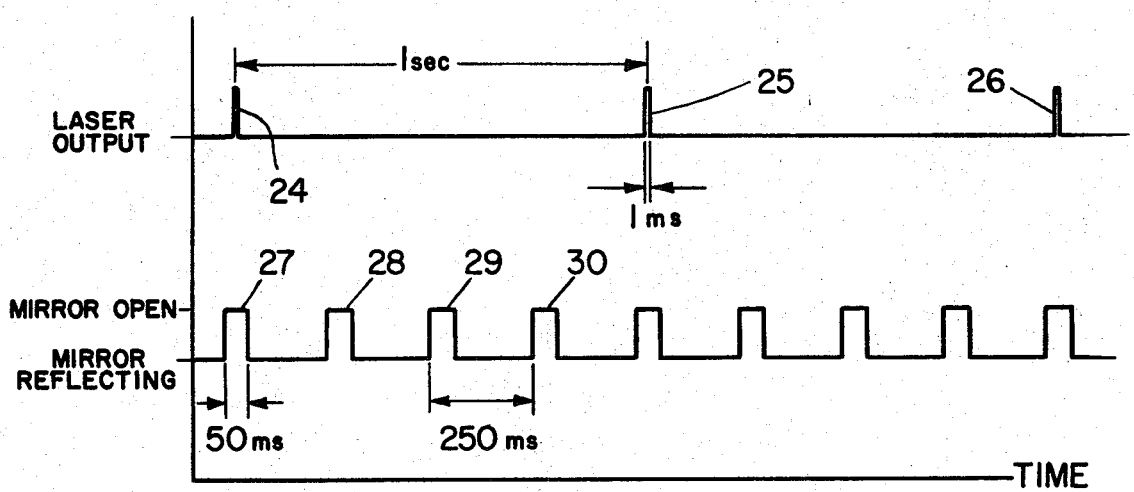

A better understanding of the invention will be had by now referring to one example thereof as illustrated in the accompanying drawings, in which:

FIG. 1 is a highly schematic perspective diagram of the laser viewing device of this invention; and, FIG. 2 illustrates time graphs useful in explaining the synchronization of the device with the laser itself.

Referring first to FIG. 1, there is illustrated a laser crystal 10 surrounded by a helical flash lamp 11 controlled from a light control 12. As is well known to those skilled in the art, optical energy is periodically pumped into the helical flash lamp 11 to result in an inverted population level of laser ions with which the crystal 10 is doped. When a certain energy level difference is achieved by the light pumped into the crystal, the inverted ion population falls back to its normal state resulting in the coherent emission of radiation as indicated at 13. The pulse width of light emitted from the laser crystal 10 may be of the order of 1 millisecond and the pulse repetition rate may be of the order of one pulse per second.

As illustrated in FIG. 1, the coherent light 13 passes in the direction of the axis A of the crystal 10 and is shown impinging upon a target 14 which may constitute the terminal ends of two components 15 and 16 to be welded together.

In accordance with the present invention, the viewing device comprises a light directing means in the form of a flat mirror 17 having a reflecting surface 17a disposed in a plane at an acute angle to the axis A. The arrangement is such that when the reflecting surface 17a is intersecting the axis A, a person may view the laser target 14 from one side of the axis A.

The other side of the mirror 17 is opaque as indicated at 17b. A portion of the mirror includes an opening 18 which is positioned relative to the plane in which the mirror 17 lies to permit laser light 13 to pass through the opening 18 when the mirror is rotationally positioned as illustrated in FIG. 1.

The mirror 17 itself is mounted for rotation to a shaft 19 driven by a motor 20. The motor 20, in turn, is synchronized for rotation with the light pump control unit 12 as indicated by the dash-dot line 21. The synchronization is such that the opening 18 will assume the position in which the laser light beam 13 passes therethrough when a pulse is being generated. Other solid portions of the mirror 17 intersect the axis A between pulses generated by the laser.

The assembly is complicated by an additional mirror 22 which is fixed in place to receive light reflected from the reflecting surface 17a of the first mentioned mirror 17 when the solid portions of the reflecting surface intersect the laser axis A. Light re-reflected from the stationary mirror 22 may be viewed from a convenient position as indicated by the eye 23.

To realize dynamic balancing of the mirror 17, it is rotated about an off-set axis B relative to the center axis C of the mirror itself.

Referring now to FIG. 2, the operation of the laser target viewing device will be understood. In FIG. 2, laser output pulses are indicated at 24, 25, and 26. In the particular example chosen for illustrative purposes, the pulse repetition rate is approximately 1 pulse per second and the average pulse width is approximately 1 millisecond. Below the time graph for the pulses there are illustrated wave forms 27, 28, 29 and 30 which indicate when the opening 18 in the mirror 17 of FIG. 1 is positioned to pass the pulses to the target. As indicated, by way of example for the wave form 27, the opening 18 will pass light over a 50 ms. period and is properly registered to pass the pulse 24, assuming the diameter of the beam 13 is about one half the diameter of the opening, for a period of approximately 25 ms. This length of time is chosen by rotating the mirror 17 at approximately 240 revolutions per minute so that the 50 ms. interruption of the reflection of the target from the mirror surface 17a will not be apparent to a viewer's eye.

As a specific example, if the mirror 17 is assumed to be about four inches in diameter and the opening 18 about one inch in diameter, the opening will intersect the axis A approximately four times per second so that there will actually be four wave forms such as indicated at 27, 28, 29, and 30 for each of the pulses. These wave forms occur every 250 ms. and the time when the mirror is reflecting the light from the target would be about 200 ms. between each wave form. Thus, the eye would be viewing the target for 200 ms. and the laser pulse will be passing through the opening during the 50 ms. period when the mirror surface is not intersecting the axis. With four wave forms being generated between any two successive pulses, the mirror is interposed for viewing approximately eighty percent of the period between pulses. As a consequence of the persistence of the human eye as noted, the shutter action will not be apparent, and for the viewer, it will appear as though he were viewing continuously the target 14.

From the foregoing description, it will be clear that the present invention has provided a novel and useful target viewing device particularly adapted for use with pulsed lasers.

While only one particular embodiment has been set forth and described, various changes that fall clearly within the scope and spirit of this invention will occur to those skilled in the art. The target viewing device is therefore not to be thought of as limited to the one example set forth merely for illustrative purposes.

What is claimed is:

1. A laser target viewing device in combination with a laser providing a light output in the form of pulses of given duration and at a given pulse repetition rate along an axis intersecting said target, comprising, in combination: a mirror lying in a plane intersecting said axis at acute angle so that a reflection of said target in said mirror may be viewed from a side of said axis; means for rotating said mirror in its own plane a given number of revolutions per minute, said mirror including at least one opening in a portion for passing laser light to said target when said portion is positioned such that said axis passes through said opening; and synchronizing means connected to said laser and said means for rotating said mirror to synchronize rotation of said mirror with said pulse repetition rate so that said opening will be positioned at said axis to pass laser light each time laser light pulses are generated.

2. The subject matter of claim 1, including an additional mirror stationarily positioned to receive light reflected from said first mentioned mirror and re-reflect said light in a convenient direction for viewing.

3. The subject matter of claim 1, in which the area of said opening relative to the area of said mirror is such that the time that said opening is positioned to pass said laser light is less than one forth the time that said mirror is intersecting said axis.

References Cited

UNITED STATES PATENTS

| 1,353,191 | 9/1920 | Thomas | 352—206 |
| 2,029,418 | 2/1936 | Friedland | 352—206 |
| 2,551,085 | 5/1951 | Bach | 352—206 X |
| 3,057,271 | 10/1962 | Mahn | 352—206 |
| 3,096,767 | 7/1963 | Gresser et al. | 128—395 |
| 3,169,183 | 2/1965 | Radtke et al. | |
| 3,265,855 | 8/1966 | Norton. | |
| 3,281,712 | 10/1966 | Koester. | |
| 3,369,101 | 2/1968 | Di Curcio. | |

OTHER REFERENCES

Linde: catalogue "Laser Welding," Dec. 30, 1964.

Electronics, Maguire, "Microwelding," July 5, 1963, pp. 23–25.

Malt: "Lasers in the Operating Room," The Technology Review, v. 66, No. 6, April 1964, pp. 25–26.

Pomrantzeff: "Photocoagulators and Surgical Diathermy," Am. J. Medical Electronics, October–December 1964, pp. 237, 240, 241.

JEWELL H. PEDERSEN, Primary Examiner

W. A. SKLAR, Assistant Examiner

UNITED STATES PATENT OFFICE
CERTIFICATE OF CORRECTION

Patent No. 3,533,707                     Dated October 13, 1970

Inventor(s) Milton S. Weiss

It is certified that error appears in the above-identified patent and that said Letters Patent are hereby corrected as shown below:

In the heading to the printed specification, lines 3 and 4, "assignor to Korad Corporation, a corporation of New York" should read -- assignor to Union Carbide Corporation, a corporation of New York --.

Signed and sealed this 26th day of January 1971.

(SEAL)
Attest:

EDWARD M. FLETCHER, JR.                WILLIAM E. SCHUYLER, JR.
Attesting Officer                      Commissioner of Patents